United States Patent [19]

Fessler

[11] Patent Number: 5,442,843
[45] Date of Patent: Aug. 22, 1995

[54] DRILLING MACHINE FOR DRILLING HOLES IN FURNITURE PARTS

[75] Inventor: Bernhard Fessler, Lauterach, Austria

[73] Assignee: Julius Blum Gesellschaft m.b.H., Höchst, Austria

[21] Appl. No.: 189,643

[22] Filed: Feb. 1, 1994

[30] Foreign Application Priority Data

Feb. 1, 1993 [AT] Austria ............................ A157/93

[51] Int. Cl.⁶ ..................... B23B 39/18; B23C 3/04
[52] U.S. Cl. ..................... 29/26A; 144/3 R; 144/92; 408/51; 408/53; 408/241 S; 483/32
[58] Field of Search ............... 29/26 A, 33 K; 483/32; 144/3 R, 3 E, 92, 108; 408/35, 51, 53, 139, 98, 241 S; 269/303

[56] References Cited

U.S. PATENT DOCUMENTS

| | | | |
|---|---|---|---|
| 527,064 | 10/1894 | Johnson | 408/139 X |
| 3,286,595 | 11/1966 | Wollenhaupt | 483/32 |
| 3,772,757 | 11/1973 | Goldstein | 144/3 X |
| 3,979,817 | 9/1976 | Cheak | 144/3 R X |
| 4,692,973 | 9/1987 | Blum | 29/33 K |
| 5,289,860 | 3/1994 | Keusch | 144/92 |

FOREIGN PATENT DOCUMENTS

| | | |
|---|---|---|
| 356875 | 5/1980 | Austria . |
| 539214 | 11/1931 | Germany . |
| 836723 | 4/1952 | Germany . |
| 2119317 | 10/1972 | Germany . |
| 2928108 | 1/1981 | Germany . |

*Primary Examiner*—Z. R. Bilinsky
*Attorney, Agent, or Firm*—Wenderoth, Lind & Ponack

[57] ABSTRACT

A drilling machine for drilling securing holes for furniture fittings, for example hinges, includes a drive motor which drives drills by way of a multispindle drilling head with a drill gearing and a plurality of drilling spindles. A stop rule with adjustable stop blocks and a feed device for the feed drill are provided, as well as a press-in die for mounting the furniture fittings on a furniture part. The drilling machine is equipped with a set of replaceable multispindle drilling heads and a set of replaceable stop rules which can be exchangeably fixed to the drilling machine by quick-action clamping devices which can be operated without the use of a tool.

16 Claims, 16 Drawing Sheets

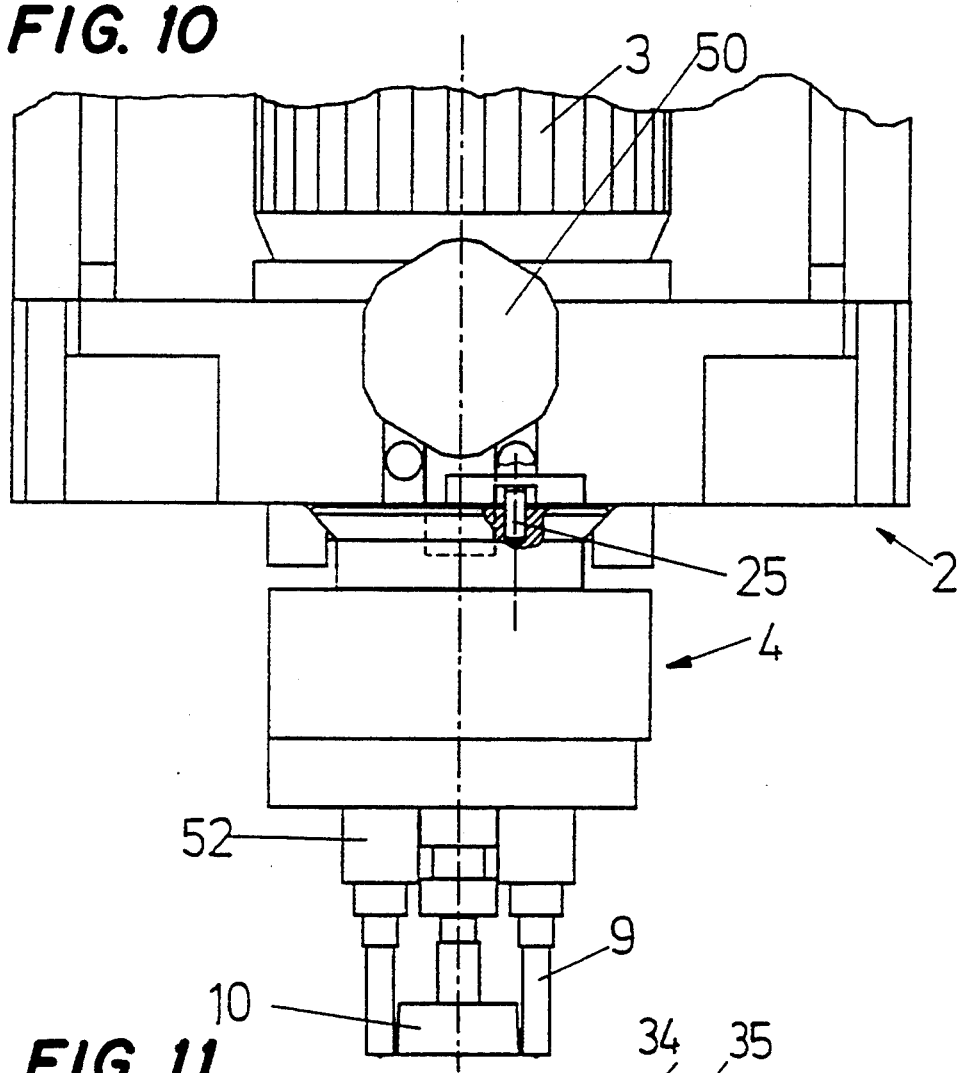
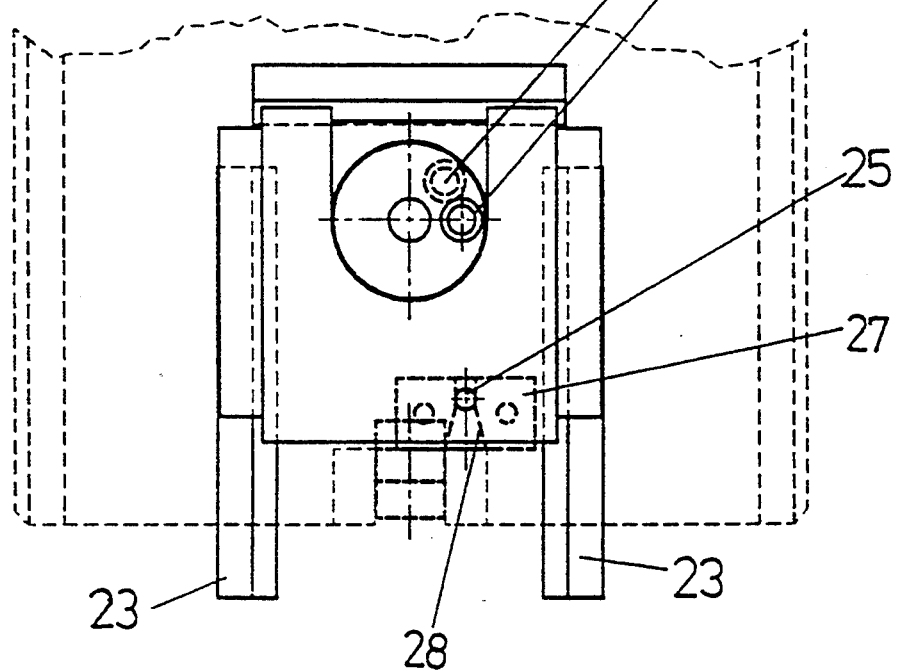

DRILLING MACHINE FOR DRILLING HOLES IN FURNITURE PARTS

BACKGROUND OF THE INVENTION

The invention relates to a drilling machine for drilling holes in furniture parts, in particular for drilling securing holes for furniture fittings, for example hinges, the drilling machine having a drive motor which drives drills by way of a replaceable multispindle drilling head with a drill gearing and a plurality of drilling spindles, and a stop rule with adjustable stop blocks, and a feed device for the drill feed, a table frame and if appropriate a press-in die for mounting the furniture fittings on a furniture part.

In modern furniture construction, in addition to complicated automatic drilling machines by means of which complete drilling patterns can be drilled into a furniture wall or a door in one single operation, there are also known drilling machines by means of which only one row of bores or the holes for a hinge can be drilled in one operation, whereupon retooling is necessary for a further drilling operation. Such drilling machines are used both in industrial firms and by industrial workshops. These drilling machines also have a plurality of drilling spindles and thus for example a plurality of 32 mm-grid holes or two small holes and one large hole, such as those required for assembly in the case of hingepots, can be drilled therewith at the same time.

Recently, drilling machines which are provided with a press-in die are frequently being used. Such a drilling machine enables both the securing holes to be drilled and the fitting part, for example a hinge, to be inserted in the furniture part. Here, the press-in die is acted upon by means of the hydraulics or pneumatics for the drill feed, or manually.

SUMMARY OF THE INVENTION

The object of the invention is to improve a drilling machine of the type mentioned at the outset such that it can be retooled more rapidly and simply than known drilling machines.

According to the invention, this is achieved by a set of replaceable multispindle drilling heads and a corresponding set of replaceable stop rules which can be fixed exchangeably to the drilling machine by means of quick-action clamping devices which can be operated preferably without the use of a tool.

When using a drilling machine according to the invention, the joiner does not have to readjust the stops on the stop rule and re-equip the multispindle drilling head with drills every time he wants to drill another drilling pattern. If a fitting is to be pressed in at once, the corresponding die is pre-equipped. With the drilling machine according to the invention, the joiner has a plurality of fitted multi-spindle drilling heads which are equipped according to a common drilling pattern and the respectively appropriate stop rule at his disposal. The number of multispindle drilling heads and fitted stop rules will depend on the size of the company and on the various drilling patterns which are repeated with a certain regularity.

If a joiner wishes to drill for example the drill holes for hingepots in furniture doors and then the securing holes for baseplates in a plurality of furniture side walls, then he will first equip the drilling machine with a multispindle drilling head and a stop rule, which are equipped according to the drilling pattern of the hingepots and if applicable have a press-in die. After he has drilled his small batch of doors, he will replace such multi-spindle drilling head and stop rule with others which correspond to the drilling pattern for securing of the baseplate. As a result, the drilling pattern which is set on the multi-spindle drilling head and on the stop rule for the door-side dowel hole bores is retained and is available for a further operation.

Re-equipping of the drilling machine is further facilitated by at least part of the multispindle drilling heads having a separate drive shaft which is located next to the drilling spindle or spindles. As a result, even in the case of very different drilling patterns, for example if there is to be a transition from an edge clearance of 22.5 mm for a hingepot to an edge clearance of 37 mm for a row of holes, one may proceed from the same 0-line both in both directions of the stop rule and as regards the clearance x from the stop rule. The depth adjustment with respect to the stop rule can be further facilitated by means of a turret stop.

BRIEF DESCRIPTION OF THE DRAWINGS

An embodiment of the invention will be described in detail below with reference to the attached drawings, wherein:

FIG. 10 shows a front view of the multispindle drilling head and the drilling machine, a coupling region between the drive motor and a drill gearing being drawn in section;

FIG. 11 shows a plan view of the coupling;

DETAILED DESCRIPTION OF THE INVENTION

Figure 1:
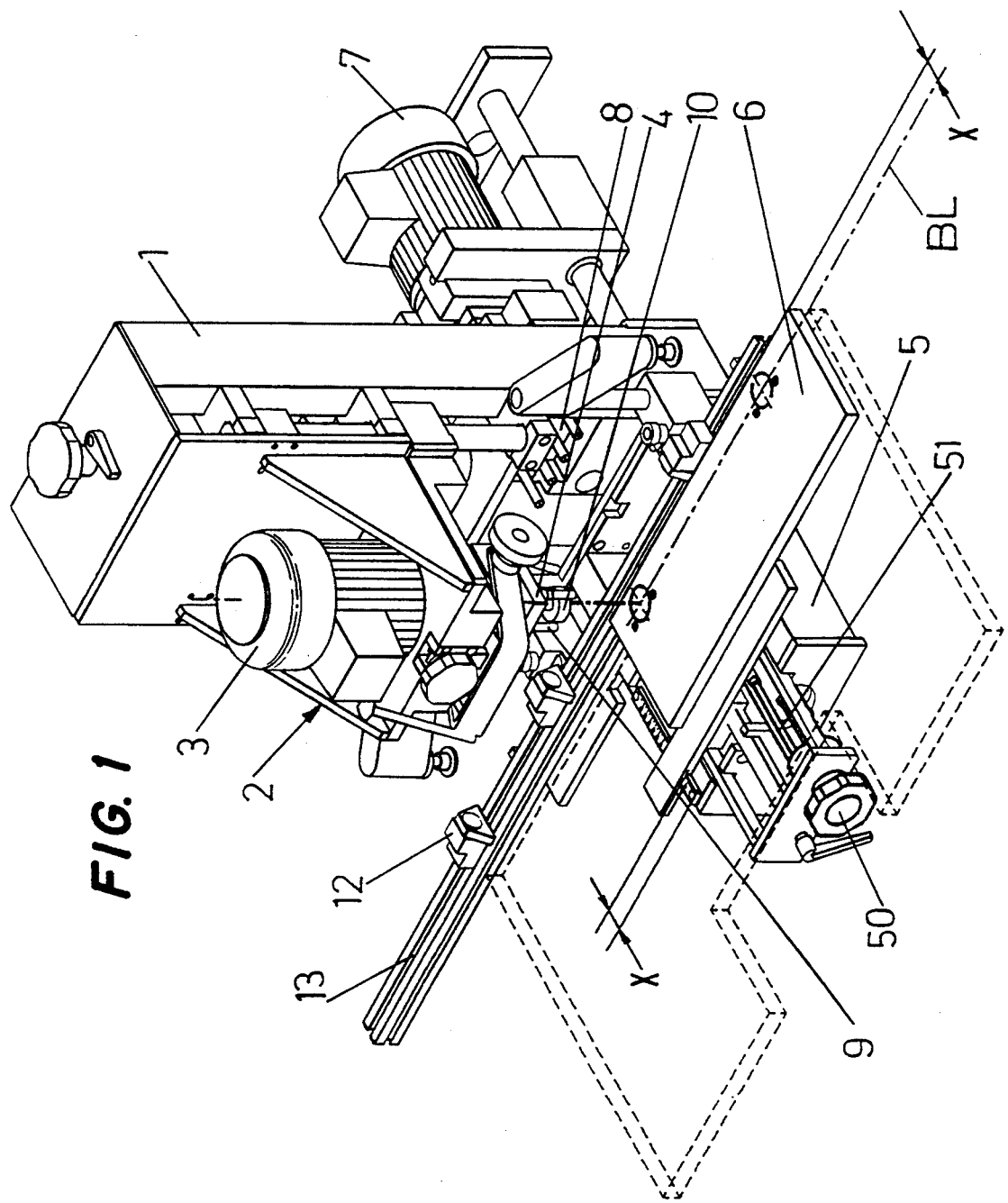
FIGS. 1 to 3 each show a diagram of a drilling machine according to the invention, seen from the front.

The drilling machine according to the invention has a frame 1 on which a feed frame 2 is mounted such that it can be lowered and raised. The feed frame 2 bears drive motor 3 for flat-side drilling. Moreover, a respective multispindle drilling head 4 with drilling spindles 52 is detachably secured to the feed frame 2. Moreover, a support mount 5 for a workpiece 6 is secured to the frame 1.

The frame 1 also bears a drive motor 7 and a multispindle drilling bar or head 8 for end-side drilling.

In the embodiment according to FIG. 1, the multispindle drilling head 4 is equipped with drills 9, 10 for drilling securing holes for a hingepot. The multispindle drilling head 4 bears drill 10 with a large diameter, which drills a hole for the hingepot, and two small drills 9 which drill holes for dowel pins.

Figure 2:
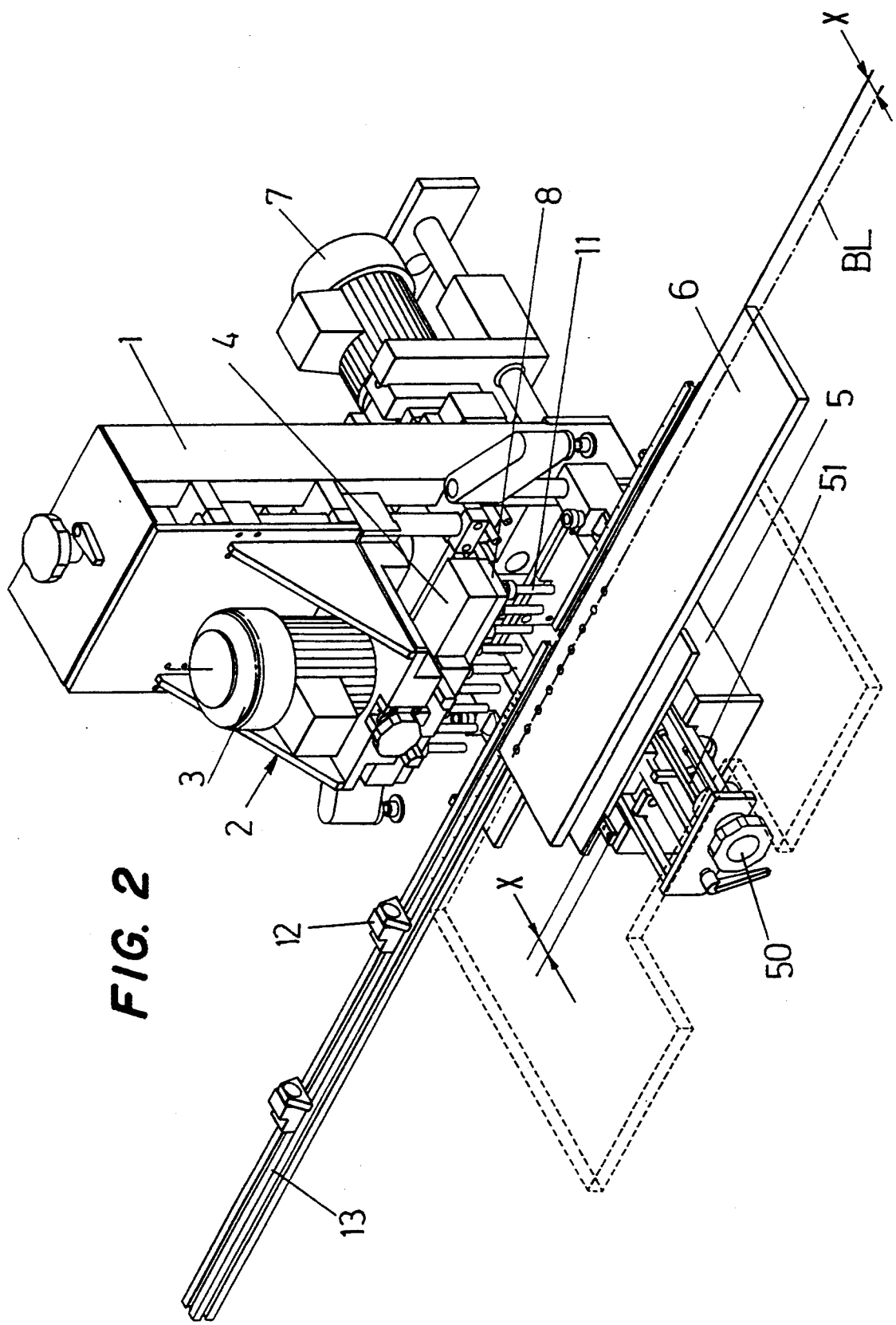

In the embodiment according to FIG. 2, the multispindle drilling head is equipped with a plurality of drills 11 for drilling a row of holes. In order to get from the drilling pattern of FIG. 1 to the drilling pattern of FIG. 2, the drills in the multispindle drilling heads 4 are not replaced nor is the position of stop blocks 12 on the stop rules 13 changed, but in each case the multispindle drilling heads 4 and the stop rules 13 are replaced, the latter remaining equipped for the respective drilling pattern.

So that one may always proceed from the same 0-line in the case of all drilling patterns, both in the direction along the stop rule 13 and in the direction towards the stop rule on setting a desired drill edge clearance x, it is provided that at least part of the multispindle drilling heads 4 has a separate drive shaft which is located next to the drilling spindles 52. In some cases, the drive shaft can be located at the same spacing from adjacent drilling spindles 52.

Figure 3:
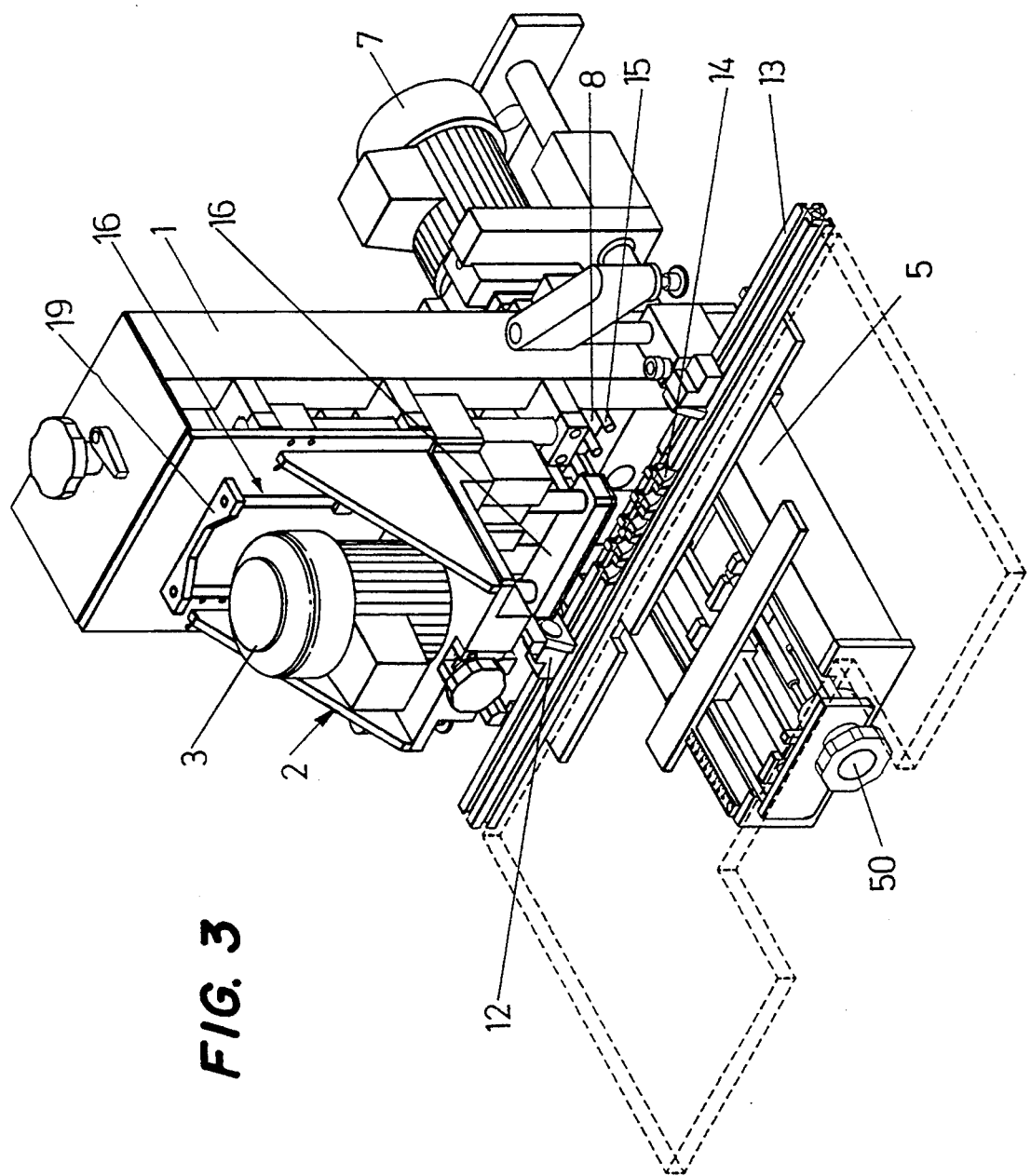
Figure 4:
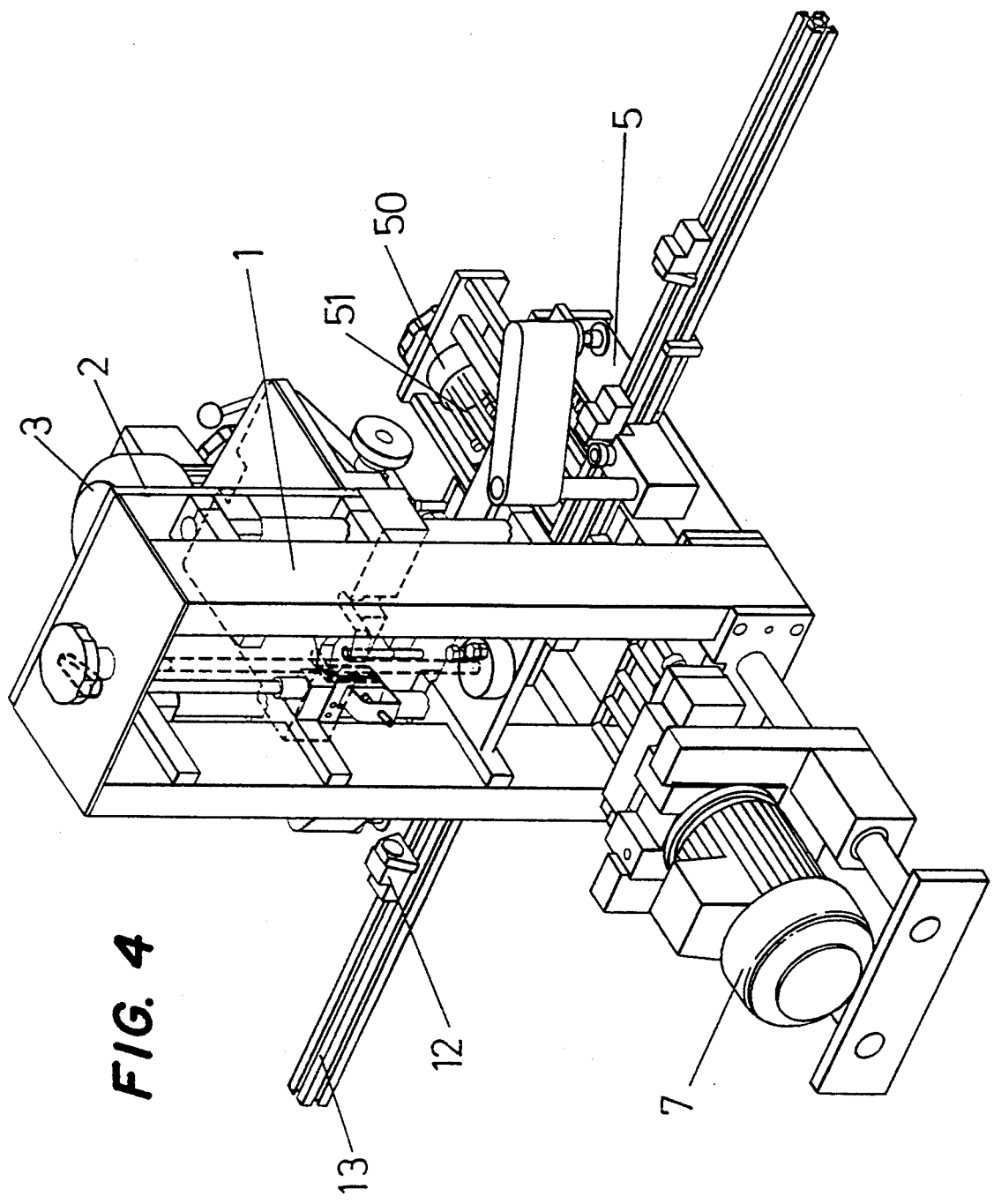
FIG. 4 shows a diagram of a drilling machine according to the invention, seen from the rear.
Figure 8:
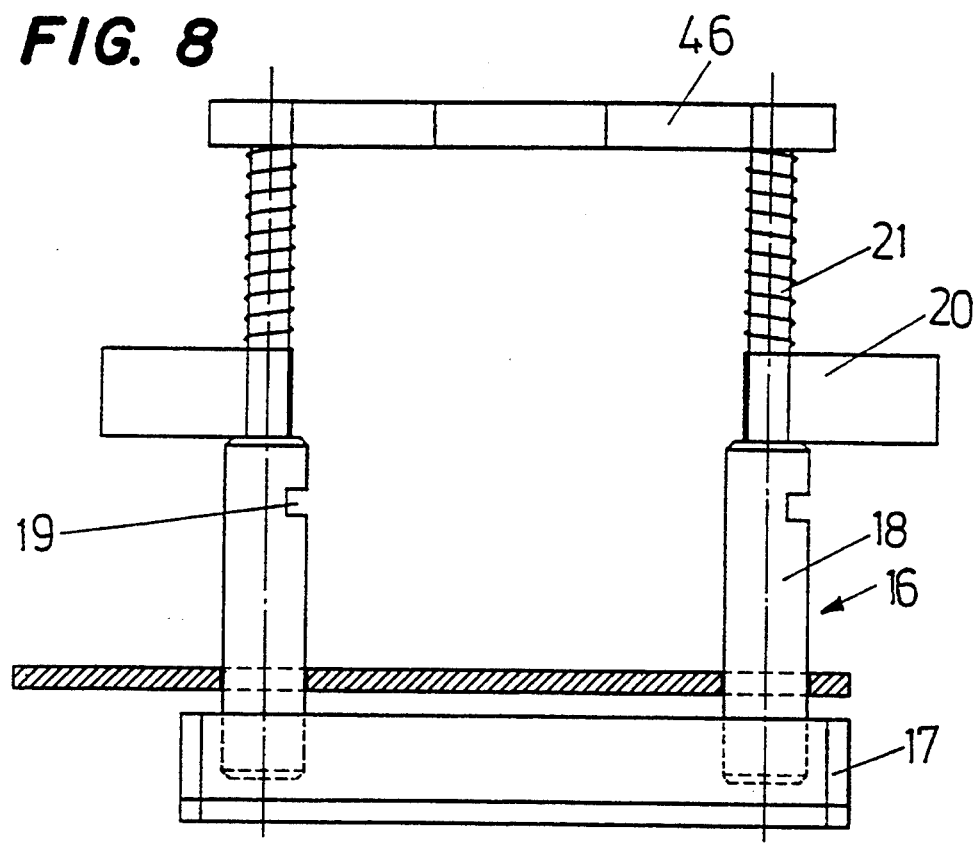
FIG. 8 shows an end view of a hold-down member for end-side drilling, the hold-down member however being in a disengaged position.
Figure 9:
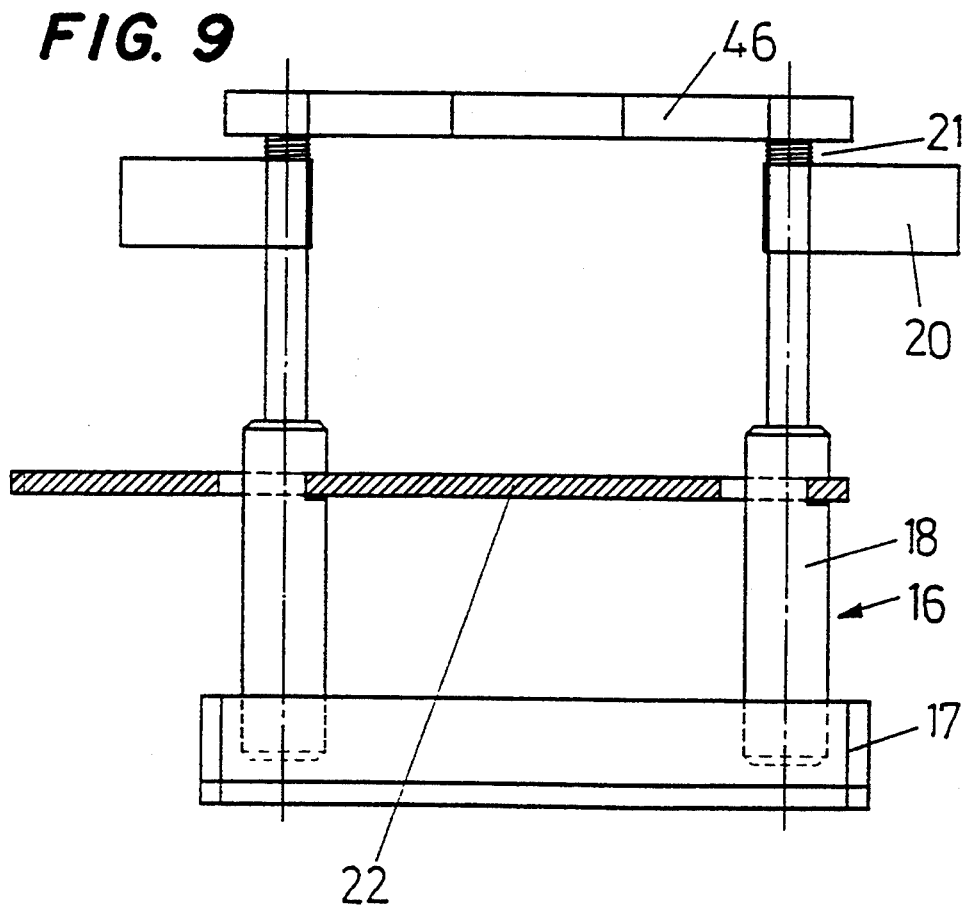
FIG. 9 shows an end view of the hold-down member in an engaged position.

FIG. 3 shows the drilling machine equipped for endside drilling. The stop rule 13 has cutouts 14 through which drills 15 of the multispindle drilling bar or head 8 can project. The multispindle drilling head 4 on the feed frame 2 is removed for which purpose a hold-down member 16 is extended. The hold-down member 16 is shown in FIGS. 8 and 9. It has a pressure bar 17 and two columns 18 which are connected at the top by way of a connection web 46. The columns 18 have notches 19 and the entire hold-down member 16 is mounted in guides 20 of the feed frame 2.

Springs 21 press the hold-down member 16 upwards. If the hold-down member 16 is to be brought into the operative position, then, as FIG. 9 shows, it is pressed downwards in opposition to the pressure of the springs 21 until a locking plate 22 can latch into the notches 19. Then, the feed frame 2 can be moved for example pneumatically with the hold-down member 16 to the workpiece 6.

Figure 5:
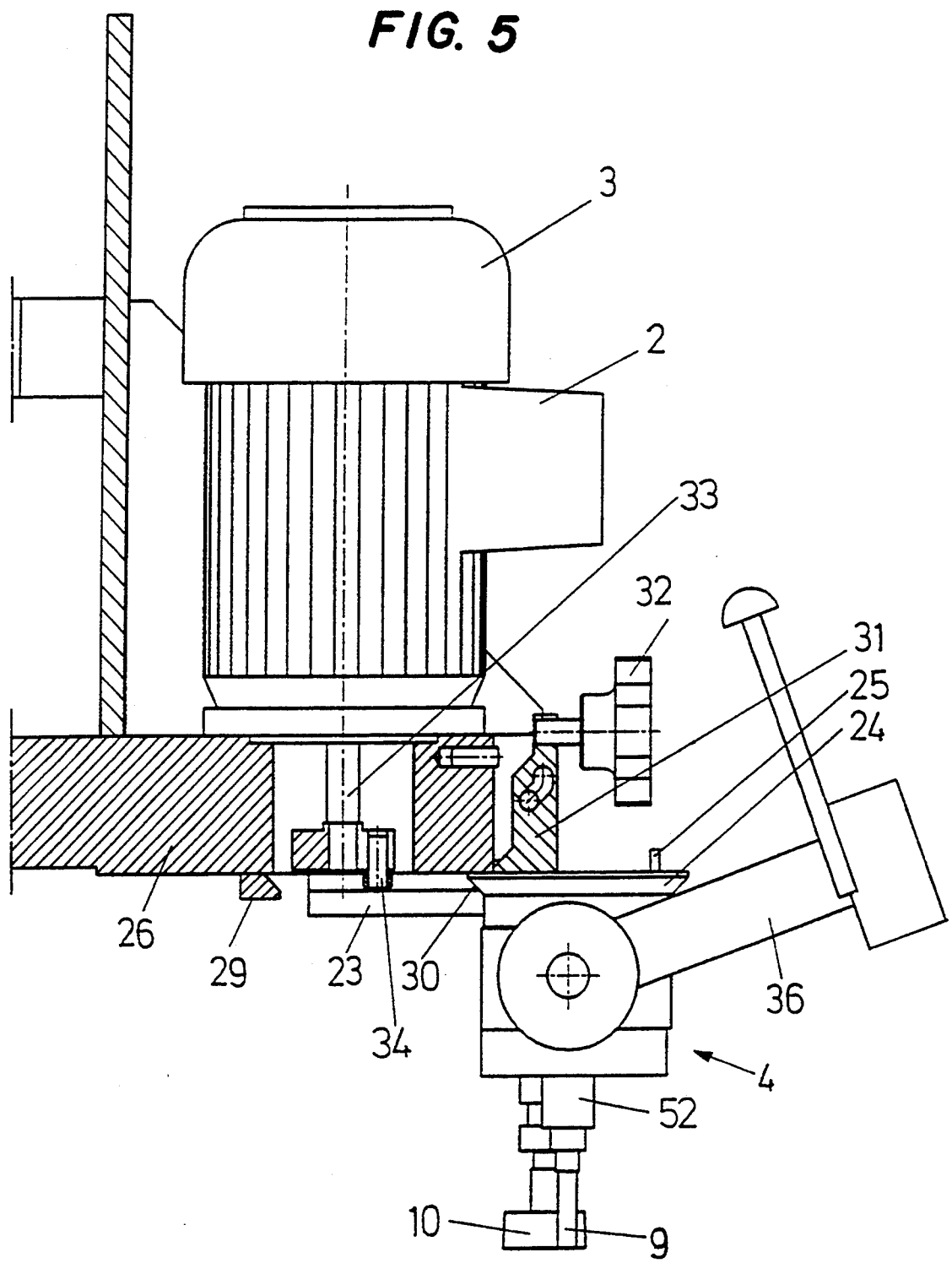
FIG. 5 shows a side view of drive motor and of multispindle drilling head, the multispindle drilling head being inserted into its anchoring on the drilling machine.

FIG. 5 shows the suspension of the multispindle drilling head 4. The multispindle drilling head 4 can be inserted from the front horizontally into guide rails 23, which is extremely advantageous, the multispindle drilling head 4 having holding rails 24 at its upper side. The guide rails 23 provide a guidance with play, so that the insertion of the multispindle drilling head 4 is easy to perform.

A positioning pin 25 which stands upwards in perpendicular manner is arranged on the multispindle drilling head. The feed frame 2 bears on its lower bearing plate 26 a small positioning plate 27 which has a V-shaped slot 28 (FIG. 11). The positioning pin 25 is inserted into this slot 28 on insertion of the multispindle drilling head 4, as a result of which the multispindle drilling head 4 is positioned laterally.

If the multispindle drilling head 4 is located in its rearmost position, it abuts against two hooks 29 which reach under the edge 30 of the multispindle drilling head 4. A hook 31 arranged movably at the front on the carrier plate 26 is brought into the position shown in FIG. 6 by way of an actuating wheel 32, in which it engages the front holding edge 30 of the multispindle drilling head 4. Here, the multispindle drilling head 4 is clamped exactly against the carrier plate 26.

Output shaft 33 of the drive motor 3 carries, in the embodiment according to FIGS. 5, 6, 10 and 11, an eccentric drive pin 34 which is moved in a circular path and in so doing entrains an entrainer pin 35 of the drill gearing, as a result of which the drilling spindles 52 are driven.

Figure 6:
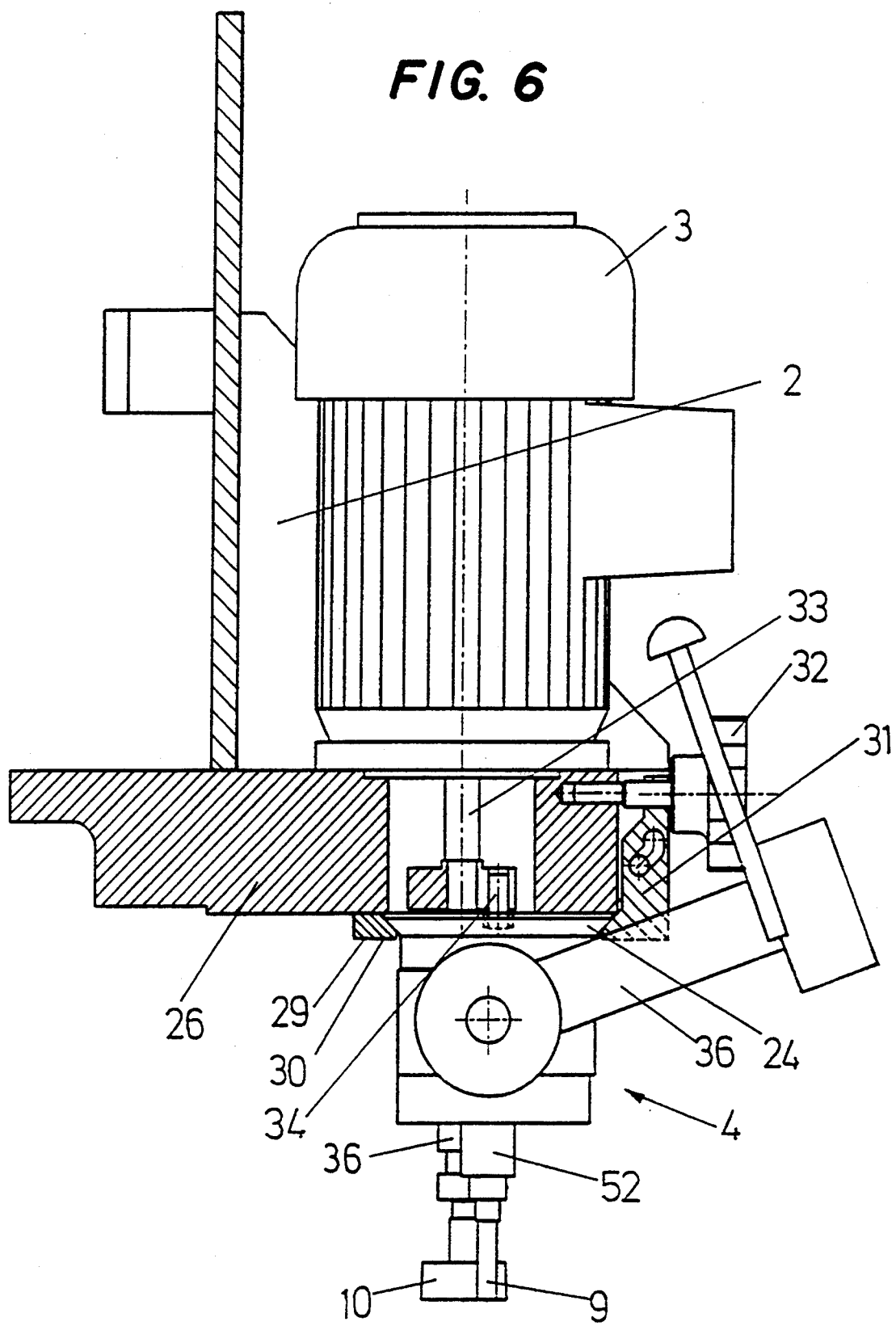
FIG. 6 shows the same side view with anchored multispindle drilling head.

In the embodiment according to FIGS. 5 and 6, a press-in die 36 for pressing in a furniture fitting, for example a hingepot, is pivotally mounted on the multispindle drilling head 4. In the drawing, the press-in die 36 is located in the drilling position. Once drilling is complete, the press-in die 36 is pivoted downwards before the drills 9, 10, whereupon pressing in can take place.

So that pivoting of the press-in die 36 can take place, the drilling machine requires a relatively large stroke height which would lead to an undesirable time loss if only drilling were to be carried out. The drilling stroke height can therefore be adjusted upwards and downwards. Adjustment downwards depends of course on the depth of the drill holes desired. The drilling stroke height upwards depends, inter alia, on whether a multispindle drilling head 4 with press-in die 36 is used or not.

The drilling machine is therefore, as shown in FIGS. 14 to 23, provided with a stop block 37 which is pivotal about a vertical axis. The stop block 37 is mounted in a U-shaped clamp 38 and is acted upon by a spring 39 which is held by a pin 40. The carrier plate 26 has two slots 41, in the disengaged position of the stop block 37 the latter projecting through one of the slots 41 when the stop plate 26 is moved upwards.

The U-shaped clamp 38 is mounted on a shaft 42 which carries a handle 43 at the upper end.

Figure 16:
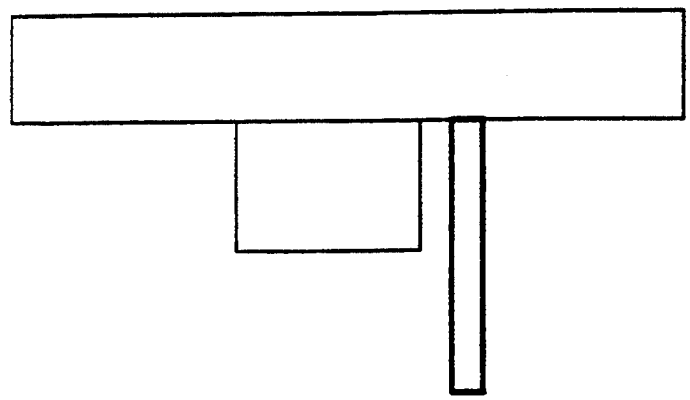
FIG. 16 shows schematically, the disengaged position of the path delimiter.
Figure 17:
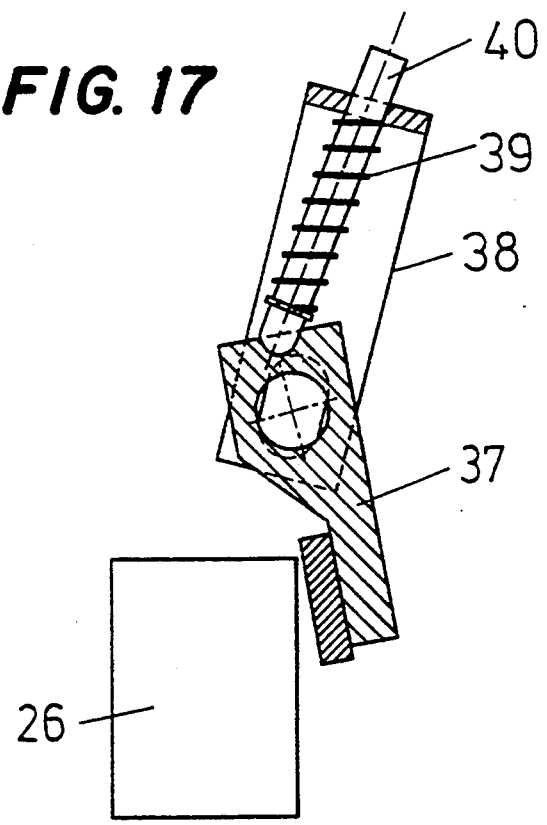
FIG. 17 shows a section through the path delimiter in the disengaged position.
Figure 18:
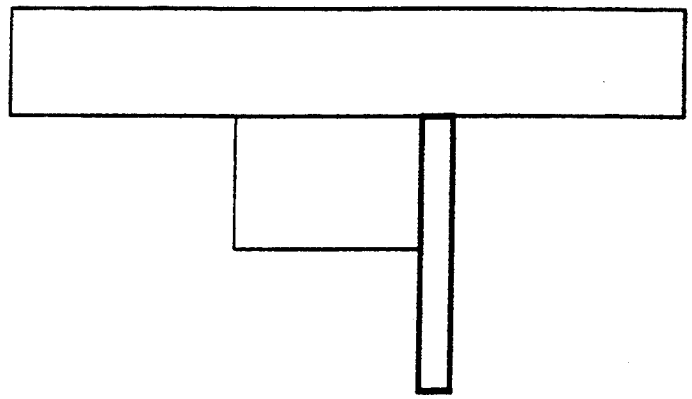
FIG. 18 shows, schematically, the position of the path delimiter after switching over to the engaged position, but before the path delimiter has pivoted into the engaged position.
Figure 19:
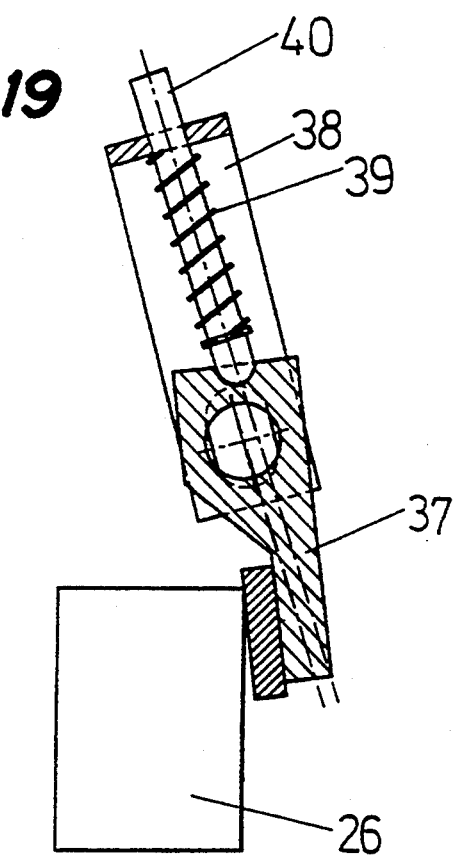
FIG. 19 shows a section through the path delimiter in this position.
Figure 20:
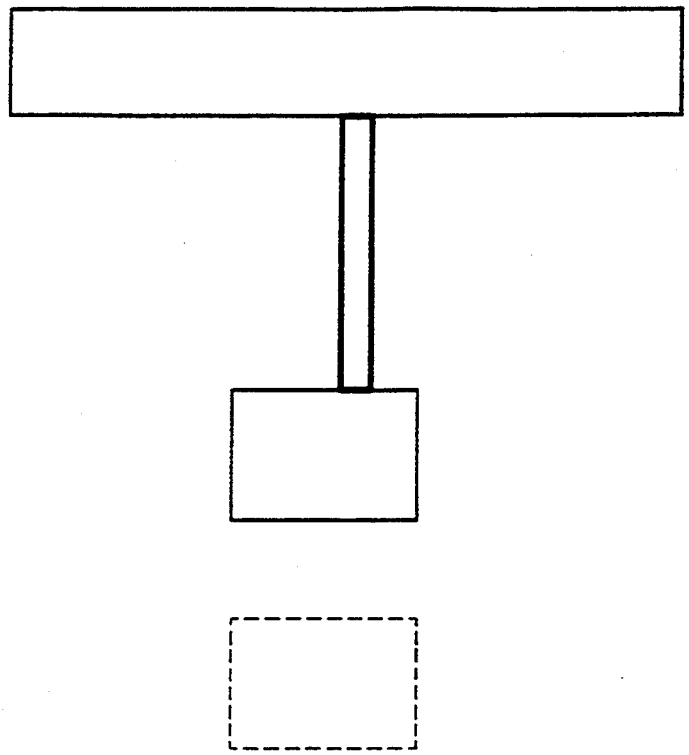
FIG. 20 shows, schematically, the position of the path delimiter in the engaged position.
Figure 21:
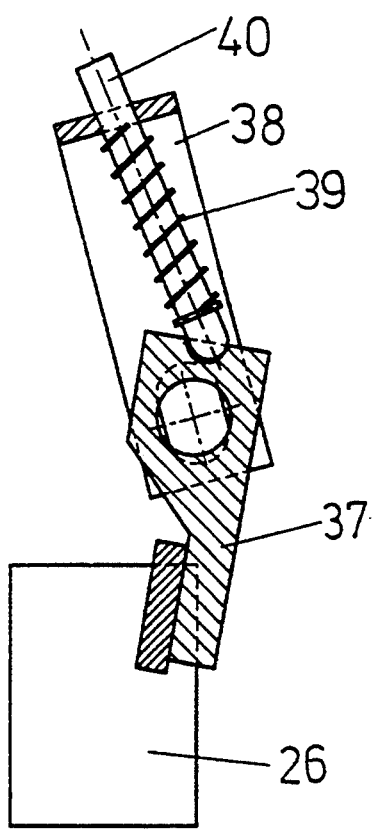
FIG. 21 shows a horizontal section through the path delimiter in this position.
Figure 22:
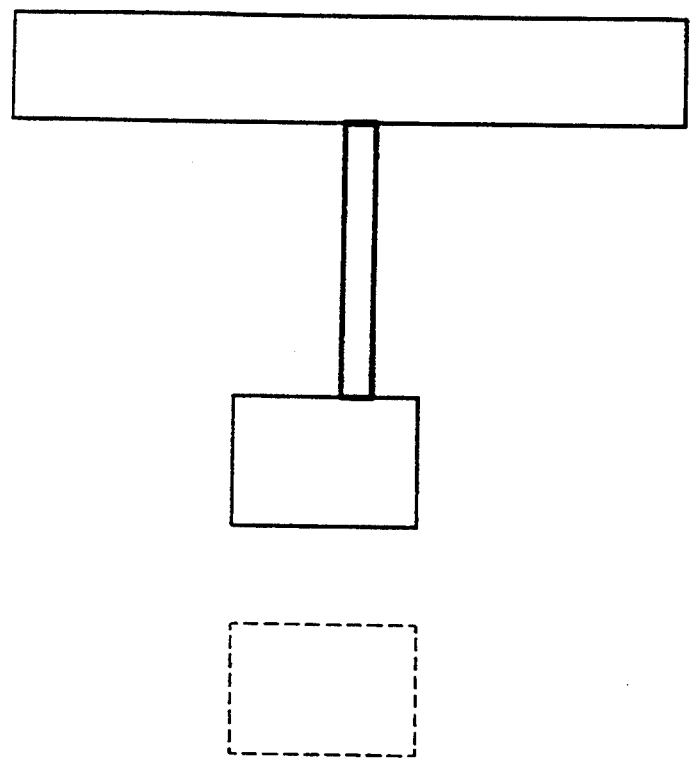
FIG. 22 shows, schematically, the position of the path delimiter when the latter is in the engaged position.

If the stop block is to be brought into the engaged position, i.e. if it is to delimit the stroke height of the drills upwards, then the U-shaped clamp 38 is pivoted by way of the handle 43 and the shaft 42, out of the position illustrated in FIGS. 16 and 17 into the position shown in FIGS. 18 and 19. However, the stop block 37 cannot yet follow the switching over and bears laterally against the carrier plate 26. Not until the next drilling stroke, when the carrier plate 26 is moved downwards, does the stop block 37 come into the engaged position shown in FIGS. 20 and 21 and 15, i.e. the carrier plate 26 bears against the stop block 37 on being raised after drilling.

Figure 23:
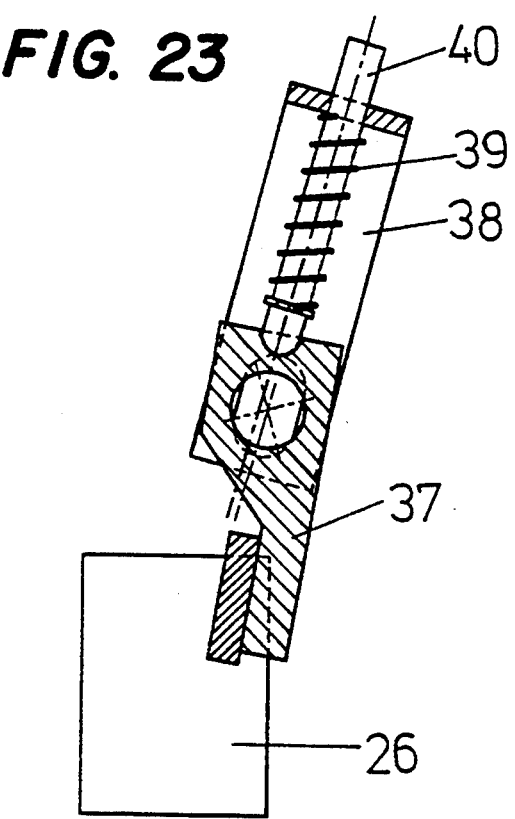
FIG. 23 shows a section through the path delimiter, the path delimiter still being in the engaged position, a U-clamp, however, having been pivoted into the disengaged position.

If the drilling machine is to be switched over again to a long stroke, the U-shaped clamp, as shown in FIG. 23, is pivoted, the stop block 37 again not being able to follow this movement directly, since it is held by the clamping action of the carrier plate 26 pressing upwards. During the next drilling stroke, however, when the carrier plate 26 is moved downwards, the stop block 37 adopts the position shown in FIGS. 16 and 17.

Figure 12:
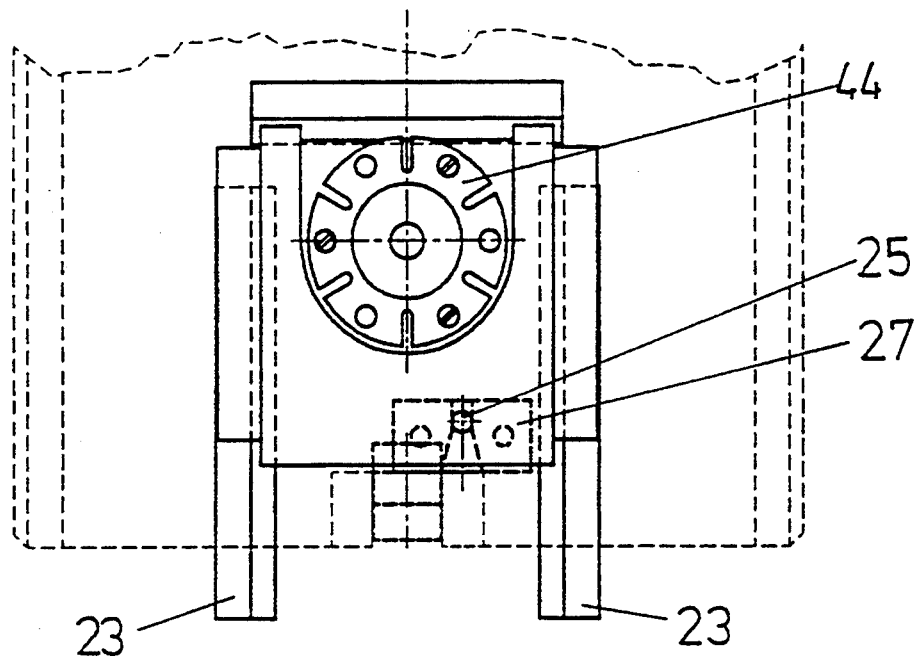
FIGS. 12 and 13 each show a plan view of a further variant of a coupling.
Figure 13:
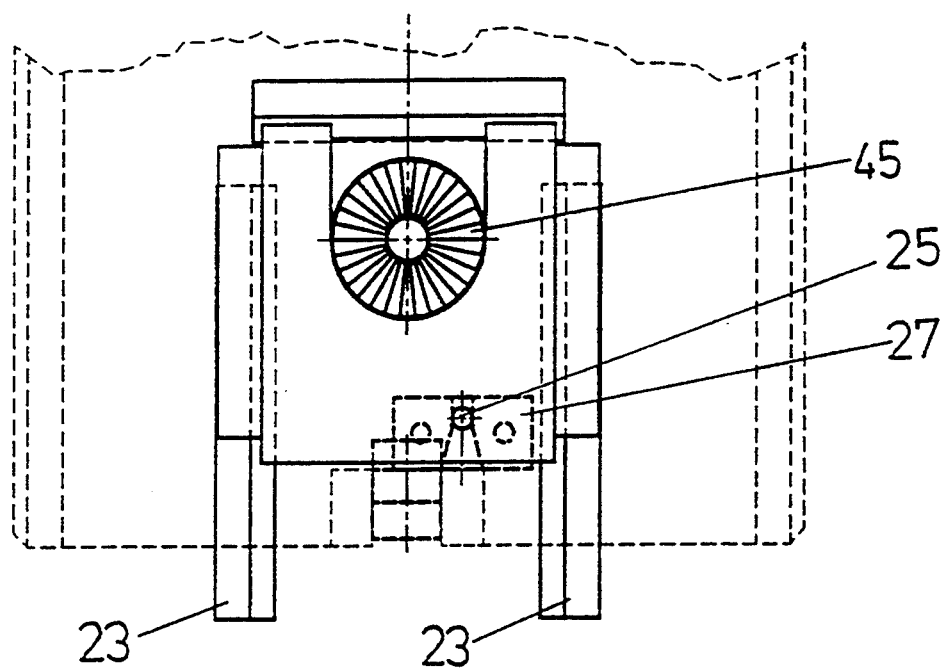
Figure 14:
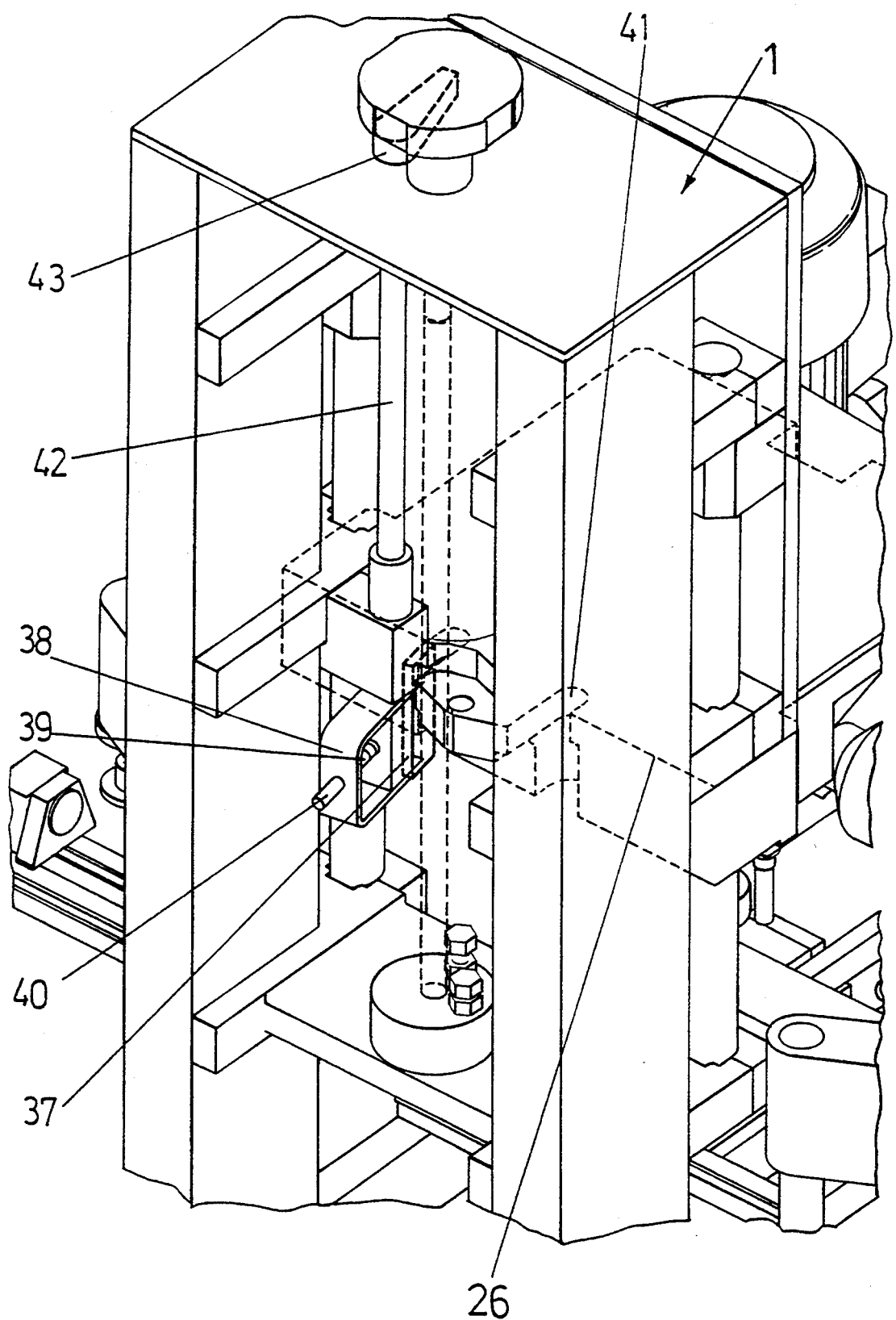
FIG. 14 shows a diagram of the drilling machine, seen from the rear, in the region of a path delimiter for the withdrawal of the drilling machine, the path delimiter being in the disengaged position.
Figure 15:
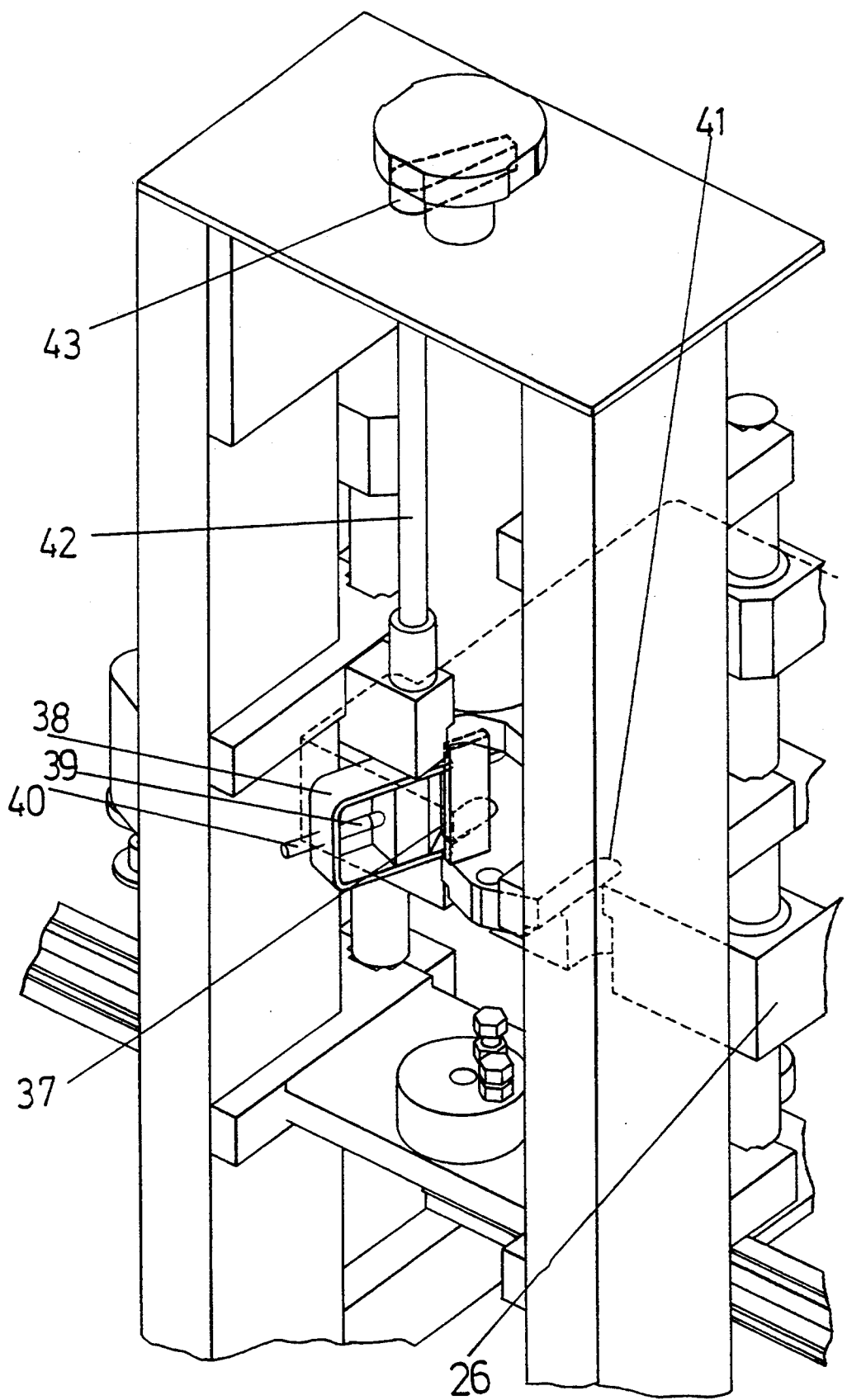
FIG. 15 shows the same view as FIG. 14, with the path delimiter brought into engagement.

FIGS. 12 and 13 show, schematically, further coupling possibilities between the output shaft 33 of the drive motor 3 and the drill gearing, FIG. 12 showing an electromagnetic coupling 44 and FIG. 13 a toothed wheel 45 with end-side, wedge-shaped teeth. Such a toothed wheel 45 is mounted both on the output shaft 33 of the drive motor 3 and on the drive shaft of the drill gearing of the multispindle drilling head 4. The vertical clearance between the rails 24 and the carrier plate 26 is of a size such that the multispindle drilling head 4 with a toothed wheel 45 can be inserted into the rails 24. Only when the multispindle drilling head 4 is clamped by the hook 31 are the toothed wheels 45 brought into engagement.

Figure 7:
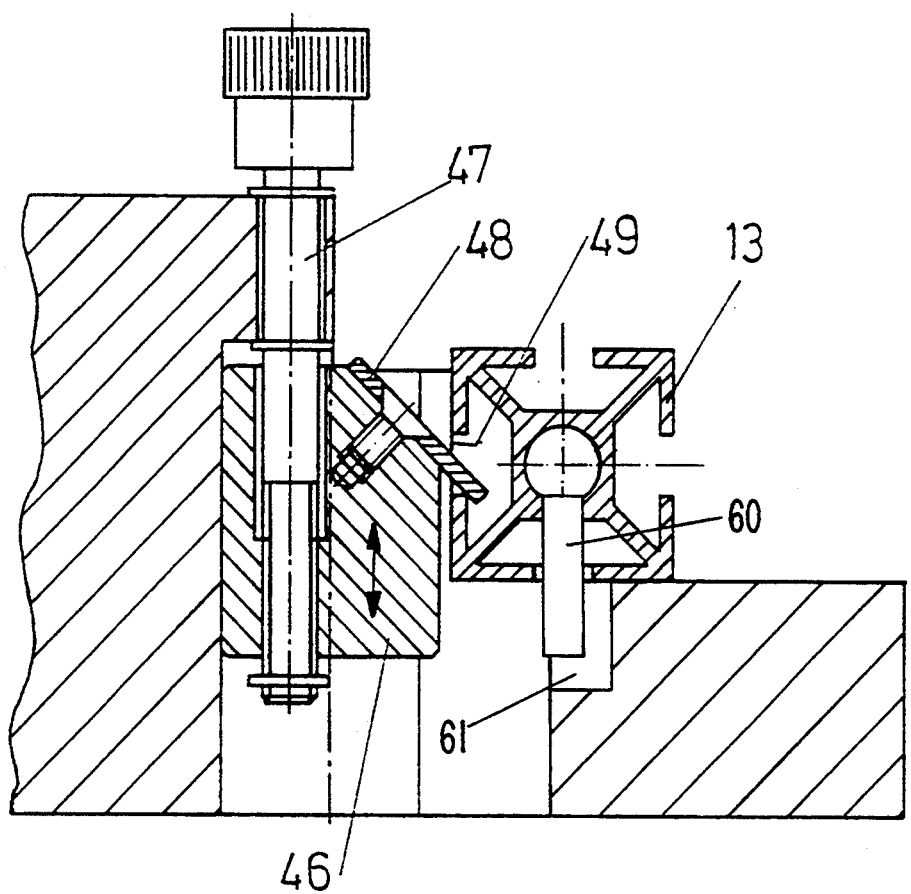
FIG. 7 shows a vertical section through a stop rule and through a securing block for the stop rule.

FIG. 7 shows the anchoring of the stop rule 13. These mounts, of which two or more are mounted on the machine, have vertically displaceable blocks 46 which are mounted on adjusting spindles 47 or the like. These blocks carry small holding plates 48 which engage in grooves 49 in the stop rules and press the stop rule 13 both downwards and rearwards, i.e. towards the table frame. The stop rule 13 is as a result securely held on the drilling machine. The stop rules 13 have at least one, preferably more positioning pins 60 which project downwards and latch into corresponding bores or slots 61 in the table frame, as a result of which the stop rules are positioned laterally.

Moreover, a turret stop 50 serving as a depth stop, which has stop pins 51 of different lengths, is arranged on the machine frame. Here, the length of the stop pins 51 corresponds to the clearances x from the drill sleeve to the stop rule 13 which occur most frequently.

I claim:

1. In a drilling machine for drilling holes in furniture parts, in particular for drilling securing holes for furniture fittings, for example hinges, said drilling machine including a drive motor which drives drills by way of a replaceable multi-spindle drilling head with a drill gearing and a plurality of drilling spindles, a stop rule with adjustable stop blocks, a feed device for drill feed, and a table frame, the improvement wherein said drilling machine comprises:
   a set of a plurality of replaceable multi-spindle drilling heads;
   a quick-action clamping device operable to fix a selected one of said drilling heads on said drilling machine;
   a set of a plurality of replaceable stop rules; and
   a quick-action clamping device operable to fix a selected one of said step rules on said drilling machine.

2. The drilling machine according to claim 1, further comprising a press-in die pivotally mounted on at least one said multi-spindle drilling head.

3. The drilling machine according to claim 1, wherein each said stop rule is provided with at least one positioning pin which projects downwards and latches into a corresponding bore in said table frame.

4. The drilling machine according to claim 1, wherein said quick-action clamping device for said stop rules comprises at least one assembly of a vertically displaceable block having a holding plate which projects laterally obliquely downwards and which engages an edge of said stop rule and acts thereon obliquely.

5. The drilling machine according to claim 1, wherein at least some of said multi-spindle drilling heads have a separate drive shaft which is located next to said drilling spindles.

6. The drilling machine according to claim 5, wherein said drive shaft has the same clearance from two adjacent drilling spindles.

7. The drilling machine according to claim 1, further comprising a hold-down member to hold a workpiece during end-side drilling and which is acted upon by a pneumatic or hydraulic cylinder of said drill feed for flat-side drilling.

8. The drilling machine according to claim 1, wherein said clamping device for said drilling heads comprises horizontal holding and guide rails into which said selected multi-spindle drilling head can be inserted from the front, each said multi-spindle drilling head having a vertical positioning pin which can be inserted into a guide plate which is arranged in the region of said guide rails and has a V-shaped positioning groove or slot.

9. The drilling machine according to claim 8, further comprising at least one movable hook by means of which a said multi-spindle drilling head inserted into said guide rails can be fixed to said drilling machine.

10. The drilling machine according to claim 9, comprising three hooks arranged at corner points of a triangle, two said hooks being rigidly mounted on said drilling machine.

11. The drilling machine according to claim 1, wherein an output shaft of said drive motor carries an eccentrically arranged drive pin which entrains a similarly eccentrically arranged entrainer pin of said drill gearing in a circular path.

12. The drilling machine according to claim 1, comprising an electromagnetic coupling provided between said drive motor and said drill gearing of a said multi-spindle drilling head.

13. The drilling machine according to claim 1, wherein both an output shaft of said drive motor and a drive shaft of said drill gearing have a respective coupling wheel with end-side teeth which mesh with one another.

14. The drilling machine according to claim 1, further comprising a path delimiter for said drill feed and comprising a spring-loaded stop block which is rotatable about a vertical axis.

15. The drilling machine according to claim 14, wherein said stop block in a locking position thereof abuts against a plate which is connected to said drive motor and which has at least one slot into or through which said stop block can be guided in a released position thereof.

16. The drilling machine according to claim 15, wherein said stop block is mounted in a U-shaped clamp on a central web of which is supported a spring and which can be pivoted by way of a vertical shaft having at an end thereof a handle.

* * * * *